(No Model.)

J. G. KEARSING.
DIE FOR BUTTONS.

No. 257,719. Patented May 9, 1882.

Witnesses
Chas. H. Smith
J. Fail

Inventor
John G. Kearsing
by Lemuel W. Serrell
atty

UNITED STATES PATENT OFFICE.

JOHN G. KEARSING, OF NEWARK, NEW JERSEY, ASSIGNOR OF ONE-HALF TO JOHN C. DICKINSON, OF BROOKLYN, NEW YORK.

DIE FOR BUTTONS.

SPECIFICATION forming part of Letters Patent No. 257,719, dated May 9, 1882.

Application filed September 30, 1881. (No model.)

*To all whom it may concern:*

Be it known that I, JOHN G. KEARSING, of Newark, in the county of Essex and State of New Jersey, have invented an Improvement in Dies for Buttons, of which the following is a specification.

Buttons have been made out of plastic compositions, horn, and similar materials, in which the material in sheets of the proper thickness is heated upon a steam-table, so as to be rendered sufficiently soft, and then pressed between dies that form the buttons. These dies are usually made of two plates, with rows of recesses that form a number of buttons at once, one of which plates is formed with countersinks that give shape to the backs and the other with countersinks that give shape to the faces of the buttons. There are also recesses around the button-dies for the reception of the surplus material. These recesses are made by a tool that bores or turns out such recesses. In dies of this character the buttons cannot be close together, because a space has to be left for the tool to revolve around the button-die to form the channel for the surplus material. These channels are often insufficient for the reception of surplus material, and in cases where the sheet of plastic composition is slightly too thick the channels become so full that the dies cannot be closed entirely, and the plastic material is so firmly pressed to the surfaces of the dies that it is difficult to detach either the surplus material or the buttons.

My invention is made for the purpose of removing the aforesaid difficulties by furnishing ample space between the button-dies for the surplus material, and at the same time I am enabled to place the button-dies much closer together than heretofore, and thereby obtain a larger number of buttons from a given-sized sheet and lessen the scrap.

Figure 1:
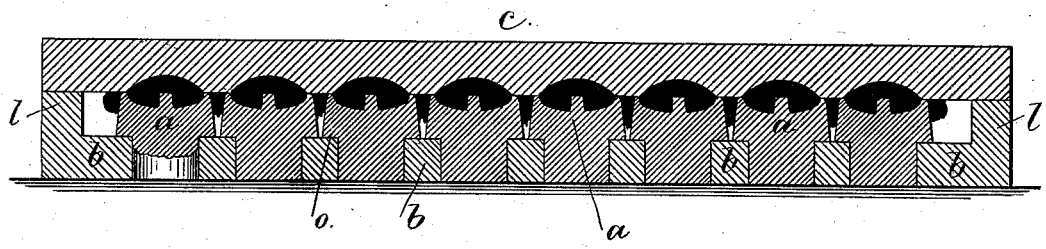
Figure 2:
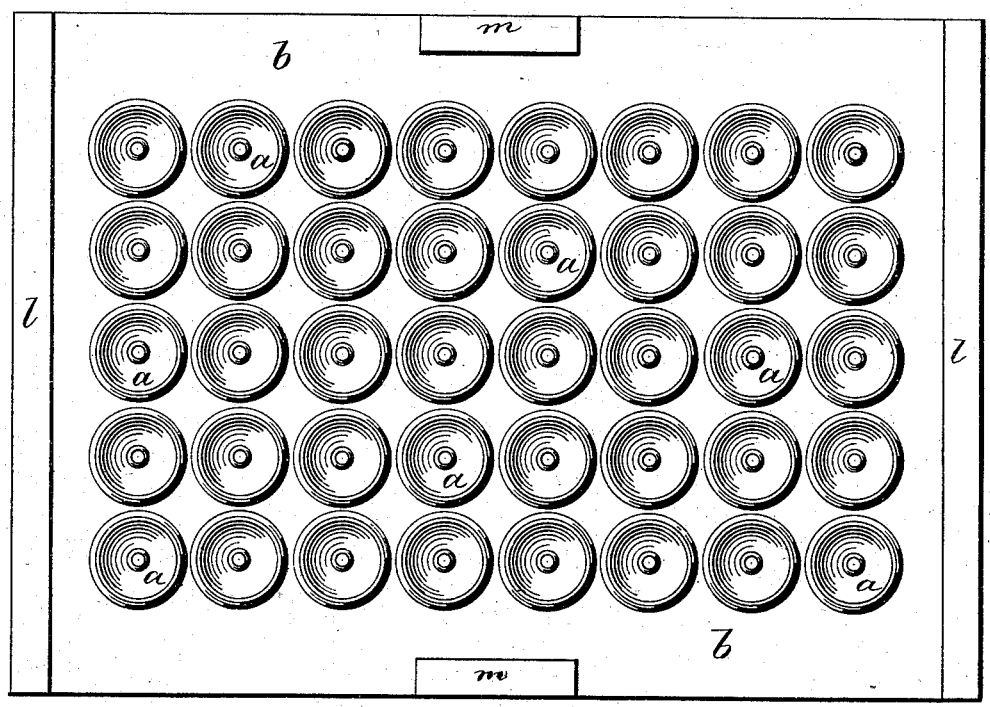

In the drawings, Figure 1 is a section of the dies, and Fig. 2 is a plan view of the lower die.

I employ a separate die, $a$, for the face of each button, and sustain them upon a die-plate, $b$, and use a countersunk plate, $c$, for the backs of the buttons. The dies $a$ are each formed with a stud or pin passing into or through the die-plate $b$, so that the dies are thereby kept in the proper position relatively to the countersinks in the back die, $c$, and each die $a$ has a base, $o$, resting upon the plate $b$, and there is sufficient distance between the base $o$ and the surface of the die to give all the space necessary between the dies for the surplus material or scrap, and the base of the die is tapering on the outside, so that the scrap is easily detached and lifted out from between the button-dies, after which the buttons are detached from the dies and removed in the usual way, which is generally done by striking the edge of the die-plate upon the table and then inverting the die-plate and dies. I provide ledges at $l\ m$ upon the die-plate, outside the dies, for the purpose of stops to prevent the die countersunk plate being pressed too hard against the narrow top edges of the button-dies, the said ledges being the same height as the top edges of the dies.

I am aware that button-dies have been made in rows with channels between them for the surplus material; but this die is made of one piece of metal, and is not provided with the deep recesses between the dies resulting from the use of the separate dies with conical bases, as in my improvement.

I claim as my invention—

The combination, with the countersunk plate $c$, that forms the backs of the buttons, of the die-plate $b$ and separate button-dies $a$, each of which has a tapering base and a stud at the bottom passing into a hole in the die-plate $b$, for the purposes and as set forth.

Signed by me this 27th day of September, 1881.

JOHN G. KEARSING.

Witnesses:
A. D. DICKINSON,
FRED L. REEVES.